United States Patent Office 3,546,296
Patented Dec. 8, 1970

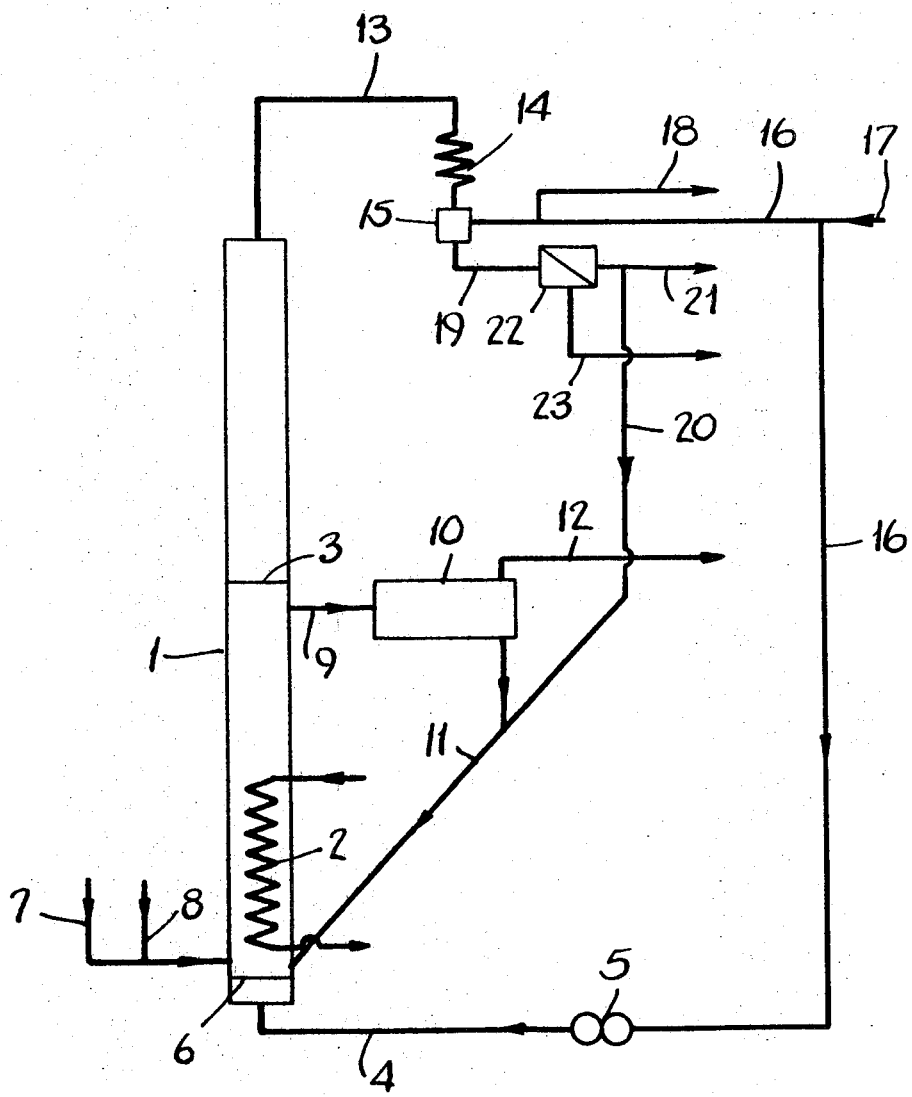

3,546,296
CONTINUOUS PROCESS FOR REDUCING AROMATIC NITRO COMPOUNDS TO AROMATIC AMINES
Georges Gobron and Robert Pipon, Melle, Deux-Sevres, France, assignors to Melle-Bezons, Melle, Deux-Sevres, France, a corporation of France
Filed Mar. 9, 1967, Ser. No. 621,881
Claims priority, application France, Mar. 10, 1966, 52,904
Int. Cl. C07b 1/00, 5/00; C07c 85/10
U.S. Cl. 260—580                           5 Claims

ABSTRACT OF THE DISCLOSURE

This disclosure describes a process and apparatus for continuously carrying out a reaction of the type in which a gaseous phase is dispersed throughout a liquid phase to maintain a particulate solid suspended in the liquid phase. The reaction is carried out in an elongated reaction vessel while continuously introducing liquid phase, and continuously withdrawing liquid phase containing solid phase and dissolved products. A portion of the liquid phase containing the dissolved products is continuously collected and a portion, together with the solid phase is returned to the reaction mixture. The reaction apparatus is designed so that under the conditions of the reaction there is a continuous flow of the liquid phase throughout the apparatus without pumping.

FIELD OF INVENTION

This invention is concerned with chemical reactions carried out in the liquid phase in the presence of a solid phase which is in particulate form and is held suspended by the force of the throughput of the gaseous phase. The three phases together comprise the reaction mixture. The separate phases may be reactants or they may be inert. Thus the liquid phase may be a liquid reactant or it may be an inert solvent in which one or more of the reactants is dissolved. The products are soluble in the liquid phase. The solid phase may be a reactant, a catalyst or simply an inert solid which aids in the mechanical movement of the reaction mixture. The gas phase may be inert. It may also be a reactant or it may be the vapors of the liquid phase. The process is a continuous process in which the reaction mixture is in continuous flow without the aid of auxiliary motive power such as pumps. The continuous flow is maintained by a combination of apparatus design and reaction conditions.

SUMMARY OF INVENTION

In accordance with this invention, chemical reactions, for example liquid phase hydrogenations are carried out in a substantially vertical elongated reaction zone, suitably a cylindrical or substantially cylindrical vessel containing, in the bottom portion, the reaction mixture or both, comprising a liquid, gaseous, and suspended solid phase. There is a void space above the surface of the reaction mixture in the lower portion of the reaction zone (or the ratio of respective heights in the case of reaction vessels the cross-sectional area of which is substantially constant, such as cylindrical vessels), and the ratio of the volume of the void space to the volume of the reaction mixture is from about 0.3:1 to about 1.5:1. Intermediate the bottom of the reaction vessel and the surface of the reaction mixture is a takeoff line including a decanter in which the solid phase tends to settle. The decanter is located at least two thirds of the vertical distance between the bottom of the reaction mixture and the top surface of the mixture.

Means are provided for withdrawing a portion of the reaction mixture containing dissolved product from the decanter. For example a pipe located in the upper section of the decanter will serve for the withdrawal of liquid phase substantially uncontaminated with the solid phase which settles to the lower section of the decanter.

The sludge of liquid solid mixture in the lower section of the decanter, containing a relatively high concentration of solid phase admixed with liquid phase, is withdrawn through exist means, for example a pipe, one end of which is affixed to the lower section of the decanter. The other end is connected to the lower portion of the reaction vessel so that the sludge can be returned to the reaction mixture. The connection descends from the decanter to the lower section of the reaction vessel. There is thus formed a closed circulatory system which, if the descending connection directly connects the decanter to the bottom of the reaction vessel, is substantially in the form of a right triangle. It is not essential that the descending pipe be directly connected. It may be coupled to the decanter through a substantially vertical connecting pipe descending from the lower section of the decanter.

The liquid phase and the gaseous phase are introduced into the reaction mixture at the lower section of the reaction vessel. The gaseous phase is withdrawn from the top section of the void space in the reaction vessel.

As aforesaid, the gaseous phase may be a reactant, it may be inert, or it may be the vapors of the liquid phase. If the gaseous phase comprises vapors of the liquid phase, they are preferably produced by distillation of the liquid phase fed to the lower section of the reaction vessel. If the gaseous phase is a reactant it is preferably utilized in relatively large excess so that it is not all consumed in passing through the liquid phase. Consumption of the gaseous phase could cause the solid phase to settle to the bottom of the reaction vessel. If the gaseous phase is inert, or if it is the vapors of the liquid, it is only necessary to introduce or to produce in the bottom portion of the reaction vessel sufficient gaseous phase at a rate such as to keep the solid phase suspended. The gaseous phase is withdrawn through the top of the reaction vessel.

It has been discovered that if the reaction is carried out under conditions such that the ratio of the specific weight of the liquid-solid mixture in the descending pipe to the specific weight of the reaction mixture in the reaction vessel is at least 1:0.8, and the ratio of the specific weight of the solid phase to the specific weight of the liquid in the decanter is at least 1.05:1, there will be continuous flow of liquid phase and solid phase through the reaction apparatus.

In carrying out the reaction, the liquid is withdrawn from the decanter and the liquid and gas introduced into the reaction mixture at such a rate that the volume of the reaction mixture remains substantially constant.

The process of this invention is applicable to a wide variety of reactions. Generally speaking, it is applicable to any and all liquid phase reactions in which a solid phase is dispersed throughout a liquid medium and can be maintained suspended therein by a stream of gas or vapor passing through the liquid medium, whether or not the gas or vapor is a reactant.

There may be mentioned, for example, all reactions of the type in which an ion exchanger, particularly an ion exchange resin, is used as a catalyst. Reactions of this kind include, for instance: aldol condensations of aldehydes and/or ketones using anion exchange resins as catalysts, or crotonization of aldehydes and/or ketones using cation exchange resins as catalysts, production of alkoxy compounds, such as a $\beta$-alkoxy carbonyl compound, for example, $\beta$-methoxy, propionaldehyde, from an alcohol, for example, methanol, and an $\alpha,\beta$-olefinic aliphatic carbonyl compound, for example, acrolein using anion exchange resins as catalysts, and production of acetals from an aldehyde and an alcohol using ion exchange resins as catalysts. Other reactions include, for example, neutralization of hydrogen or hydroxyl ions in solutions utilizing anionic or cationic resins. Hydrogenation and dehydrogenation reactions carried out in the liquid phase, in the presence of a dispersed solid catalyst, the liquid being traversed, respectively, by excess hydrogen or by vapors of the liquid itself may be carried out in accordance with this invention. A heating device separate from the main reaction apparatus may be provided to generate vapors of the liquid.

Generally speaking, the reaction conditions with respect to temperature, pressure and the like under which the above mentioned reactions are carried out are similar to the conventional conditions usually employed.

The invention will now be described in detail as applied to liquid phase hydrogenations. The description is intended only as illustrative of the invention, which as indicated above, is not limited to such hydrogenations.

In accordance with this invention, liquid phase hydrogenations are carried out in a substantially vertical, elongated reaction vessel in a liquid reaction medium into the lower portion of which the compound or compounds to be hydrogenated are continuously introduced together with a large volume of hydrogen and a solvent for both the reactant and the products. At the upper portion of the reaction medium sufficient solution containing dissolved reaction product is withdrawn so as to maintain the volume of the reaction bath substantially constant. The reaction medium contains dispersed hydrogenation catalyst, a portion of which is withdrawn with the reaction product. Provision is made for returning the catalyst, recovered solvent and hydrogen to the reaction bath.

The hydrogenation reactions in accordance with the process of this invention are carried out in a substantially vertical reaction vessel, which is extremely high compared with its other dimensions and which is only partially filled with the reaction medium so that there is a substantial amount of free space above the surface of the reaction medium. The hydrogenation catalyst is maintained in suspension in the reaction bath. Hydrogen, reactant and solvent, if necessary, are continuously fed into the lower portion of the bath and there is continuously withdrawn from the upper portion of the bath, a sufficient quantity of the bath to compensate for the quantities of materials introduced at the bottom of the bath. The rates of introduction and withdrawal are kept at a level such that the volume of the reaction bath remains substantially constant. The hydrogenated product or products are separated and the reaction solvent and catalyst are returned to the reaction bath.

In carrying out the process of the invention the preferred reaction vessel is an elongated cylindrical tube, although other configurations may also be used. The height to diameter ratio of the reaction bath in the vessel may vary from about 5:1 to about 65:1. Typically, the height of the bath or mixture may vary from 2 to 10 meters. With a 2-meter bath the diameter is normally from 0.03 to 0.10 meter, and with a 10-meter bath the diameter is normally from 0.75 to 2 meters. Noncylindrical baths are similarly dimensioned so that the height to diameter ratio of the reaction mixture is from about 5:1 to 200:3 (or about 65:1). It follows that the reaction vessels are designed and operated so that the ratio of the total height (reaction mixture plus void space) to diameter is from about 6.5:1 to 162.5:1. The reaction bath is maintained in a substantially vertical position.

The hydrogenation is effected in a reaction bath containing from about 20% to about 90% solvent based on the total weight of the components of the bath. The solvent should be chemically inert under the reaction conditions. It should also dissolve both reactants and products and its boiling point under the reaction conditions should be sufficiently above the reaction temperature so that solvent losses during the reaction are kept at a minimum. In the reaction bath the reactants are generally concentrated in the lower portion of the reaction zone, the products concentrate in the upper zone and in the middle zone the composition is intermediate these extremes.

Any of the wide variety of solvents or mixtures of solvents may be employed. The selection of the particular solvent or solvent mixture depends principally on the solubility of the reactants and products, the reaction temperature and the boiling point of the solvent at the selected reaction pressure which may be atmospheric, or above or below atmospheric. Typically useful solvents include, for example, mono or polyhydric alcohols such as ethanol, n-butanol, 2-ethyl-butanol, and xylitol; esters such as n-butyl acetate, 2-ethyl-hexyl acetate and 2-ethyl-hexyl 2-ethyl hexanoate, hydrocarbons such as xylene and cyclododecane, ethers such as di-n-butyl ether and polyalkylene glycol ethers, phenolic compounds such as phenol or toluol, and amines such as cyclohexylamine. It is often advantageous to employ the reaction product as the solvent. For example cyclohexylamine can be used as the solvent for the reduction of nitro cyclohexane to cyclohexylamine.

As aforesaid, there is a large empty volume in the reaction vessel above the reaction bath. The reason for this is that the strong gaseous stream which passes through the reaction bath entrains a part of the liquid in the bath in the form of a mist which must travel for a considerable distance in the void volume before resolving itself into fine drops which fall back into the reaction bath. In those cases where water is produced as a by-product of the hydrogenation the water may be carried off as an overhead with the solvent either by physical entrainment or as an azeotrope. It is advantageous in such cases to select a solvent which is immiscible or only partially miscible with water so that after condensation of the vapors the water may be removed by simple decantation and the solvent returned to the reaction bath.

The bath contains a finely divided hydrogenation catalyst dispersed therethrough. The catalyst is of conventional kind. According to the compound to be hydrogenated, there may be used, for example, nickel deposited on a carrier, copper deposited on a carrier, etc. It is kept in suspension principally by the strong flow of hydrogen.

The hydrogenation temperature is chosen in conventional ranges according to the compound to be hydrogenated. For example the temperature may be from 50° C. to 150° C. Preferably it will be 20–30° C. lower than the boiling temperature of the solvent under the operating pressure.

Desirably the hydrogen is fed to the lowest part of the reaction zone and the compound to be hydrogenated is introduced just above the hydrogen feed point. Withdrawal of liquid bath containing the reaction product or products is preferably effected from the uppermost part of the bath, just below the upper level reached by the liquid bath during the hydrogenation operation. By suitably controlling the feed of compound to be hydrogenated it is thus possible to obtain a raw reaction product having the lowest possible content of nonhydrogenated starting material. For example the maximum feed rate of compound to be hydrogenated is advantageously so chosen that the raw reaction product withdrawn from the upper part of the bath contains no more than 100–200 p.p.m. of nonhydrogenated starting material.

Preferably, the amount of hydrogen utilized is such that the volume of excess hydrogen passing through the bath is from 3 to 6 times as large as the volume of hydrogen consumed by the reaction during the same time. It is however possible to operate using a far lower amount of hydrogen, but to the detriment of the rate of production per unit of volume of the bath, or, on the contrary, a far higher amount thereof. In actual practice it is advisable to provide such a cross section of the reactor that the rate of excess hydrogen passing therethrough is from 4 to 10 cubic meters per hour per square decimeter of horizontal cross section of the bath.

Preferably the liquid continuously withdrawn from the upper part of the bath is introduced into a decanting device in which the catalyst separates, in the form of a sludge, from the reaction products. The catalyst-liquid mixture deposited in the bottom part of the decanting device is sent back to the reaction zone while the clear, supernatant liquid free from catalyst is withdrawn from the decanter and treated in accordance with conventional techniques for separation of the components thereof and recovery of the solvent which is reused and of the desired hydrogenation product or products.

The following description with reference to the annexed drawing, which is only illustrative and not limitative, will show a preferred manner of carrying out the invention.

The drawing is a schematic representation of an apparatus suitable for carrying out the present process.

In the drawing the reaction vessel is a vertical, cylindrical tube 1 fitted at its lower part with a heating device 2, for example a coil through which steam may be passed. The reactor contains the reaction bath the upper level of which, during the operation, is stabilized at 3 as shown in the drawing. The bath is fed at its bottom part with hydrogen which is introduced through a pipe 4 by means of a pump 5 and is dispersed throughout the bath by means of a conventional gas-dispersing device 6, for example a perforated plate, a porous plate, a perforated tube or the like. The bath is also fed, just above the hydrogen feed level, with the compound to be hydrogenated and the solvent if a solvent is employed. The compound to be hydrogenated is fed through a pipe 7 either in pure condition—possibly in molten state if it is a solid at room temperature—or dispersed throughout the solvent if any. The solvent may be introduced, wholly or in part, apart from the compound to be hydrogenated, through a pipe 8. Introduction of solvent, if a solvent is employed, is necessary to compensate for the withdrawal thereof from the upper part of the bath together with the reaction products.

The reaction mixture is continuously withdrawn from the reactor by a pipe 9 and sent to a decanter 10 from which a catalyst-liquid mixture deposited therein is withdrawn and sent back to the lower portion of the reaction bath by a pipe 11, while there is withdrawn by a pipe 12 the required amount of clear, supernatant liquid to maintain the volume of the bath constant. The clear liquid withdrawn is then treated by conventional techniques to recover therefrom the solvent which is sent back to the bath, and the desired product or products which is or are collected.

From the top of the reactor, by a pipe 13, issues the excess hydrogen laden with entrained solvent and reaction water, if any. This effluent mixture passes through a condenser 14 in which the entrained vapors are liquefied. In a separator 15 the residual gases separate from the condensed liquid and are taken by a pipe 16 through which they are sent back into pipe 4 via pump 5 after receiving from a pipe 17 a suitable amount of fresh hydrogen to maintain the constancy of the gaseous stream. By a pipe 18 a controlled volume of gas is continuously discarded from the gas circuit to maintain the purity of the hydrogen in said circuit.

The solvent condensed in 14 and separated from the hydrogen in 15 is sent back to the bath, wholly or partly (in the latter case the excess solvent is withdrawn by a pipe 21 to be reused later on), by pipes 19, 20, and 11, to maintain constant the content of compound to be hydrogenated in the lower portion of the reactor. In the case where the hydrogenation causes formation of reaction water, this water is separated either by decantation in a decanter 22 from which the lower, water layer is withdrawn by a pipe 23, if the water is immiscible with the solvent and forms a layer distinct from the solvent layer, or, if this is not true, by distillation of the water-containing, excess solvent withdrawn by pipe 21.

EXAMPLE 1

This example illustrates the production of tolylene diamine by hydrogenation of dinitro toluene (a commercial mixture of 80% by weight of the 2,4-isomer and 20% by weight of the 2,6-isomer).

In the apparatus employed, reactor 1 is 2.8 meters high and has an inner diameter of 54 millimeters. Pipe 9 is situated 1.4 meters above the bottom of the reactor. The volume of decanter 10 is 2 liters.

Initially, reactor 1 is filled with 4.2 kg. of a bath comprising, by weight, 75% of 2-ethyl butanol and 25% of tolylene diamine. With this amount of bath, the upper level of the bath during the hydrogenation operation is stabilized just above pipe 9, at a height of 1.85 meters as shown in the drawing, and decanter 10 is full. To the bath is added 280 g. of a nickel catalyst on a carrier.

There is fed to the bottom part of the reactor 2 m.$^3$/hr. of hydrogen. The purity of the hydrogen in the gas circuit is kept at 95% by volume by suitable control of the gas discarding through pipe 18.

The temperature of the reaction bath is adjusted to and maintained at 120° C. and there is fed by pipe 7, 3,785 g./hr. of a 15% (by weight) solution of dinitro toluene in 2-ethyl butanol.

The excess hydrogen issuing by pipe 13 entrains 2-ethyl butanol and water which are condensed in condenser 14 and separated by decantation in decanter 22. The water is removed by pipe 23 and a part of the 2-ethyl butanol is removed by pipe 21 for maintenance of an amine concentration in the upper portion of the reaction bath of about 25% by weight.

The amount of liquid bath withdrawn per hour by pipe 9 is 2.7 liters. The amine produced is withdrawn by pipe 12 in the form of a 25% (by weight) solution in 2-ethyl butanol at a rate of 1.6 liters per hour of this solution, so as to maintain constant the level of the bath in the reactor.

The molar amine yield amounts to 98.7%. In the liquid withdrawn by pipe 12 the dinitro toluene concentration is 30 p.p.m., the toluidine concentration is 200 p.p.m. and the water concentration is 0.6% by weight.

In this example, the ratio of the specific weight of the mixture in pipe 11 to the specific weight of the mixture in reactor 1 is about 2:1. The ratio of the specific weight of the solid catalyst to the specific weight of the liquid in decanter 10 is about 4:1.

EXAMPLE 2

The example illustrates the production of xylitol by hydrogenation of xylose.

The apparatus is identical with that of Example 1 but is operated under pressure.

At starting, the reactor is filled with a bath comprising, by weight, 85% of 80 vol. percent ethyl alcohol and 15% of xylitol. There is added to this bath 280 g. of a nickel-on-carrier catalyst. The hydrogenation reaction is carried out under pressure of 5 kg./cm.$^2$ effective and at a bath temperature of 100° C. Under these conditions the height of the reaction mixture is 1.7 meters.

There is fed to the bottom part of the reaction vessel 1 m.$^3$/hr. of hydrogen. The purity of the hydrogen in the gas circuit is kept at 95% by volume as disclosed in Example 1. There is also fed to the lower part of the reactor 1120 g./hr. of a 15% (by weight) solution of xylose in 80 vol. percent ethyl alcohol.

The whole amount of aqueous ethyl alcohol condensed in condenser 14 is sent back to the reactor and the xylitol solution is withdrawn by pipe 12 so as to maintain constant the level of the bath in the reactor.

The xylitol yield amounts to 99.8%.

In this example, the ratio of the specific weight of the mixture in pipe 11 to the specific weight of the mixture in reactor 1 is about 1.3:1. The ratio of the specific weight of the solid catalyst to the specific weight of the liquid in decanter 10 is about 5:1.

What is claimed is:

1. A continuous process for reducing aromatic nitro compounds to form aromatic amines wherein hydrogen is dispersed throughout a liquid phase containing said nitro compounds and which liquid will dissolve said amines to suspend a particulate solid catalyst to form a reaction mixture, the process being carried out without pumping in a closed reaction system in which the reaction mixture is in continuous flow, which process comprises continuously forming said reaction mixture while maintaining the same at a temperature of from about 50° C. to 150° C. in the lower portion of an elongated, substantially vertical reaction zone having a void spacer in the upper portion thereof, the ratio of the volume of void space to the volume of the reaction mixture in the lower portion of the reaction zone being from about 0.3:1 to about 1.5:1; continuously withdrawing a mixture containing at least a part of the liquid phase which contains reaction product together with at least a part of the suspended solid catalyst from a point which is at least two-thirds of the vertical distance between the bottom and the top of said lower portion of the reaction zone, the specific weight ratio of the solid catalyst to the liquid phase in the withdrawn mixture being at least 1.05:1; separating and collecting a sufficient quantity of the liquid phase thus withdrawn at a rate so as to maintain the volume of the reaction mixture substantially constant; returning to the reaction mixture the remaining quantity of the liquid phase thus withdrawn together with the withdrawn phase from the top of the reaction zone and returning said gaseous phase to the reaction mixture; the specific weight ratio of said liquid-solid mixture to the reaction mixture being at least 1:8.8.

2. A process in accordance with claim 1 in which the volume of hydrogen passing through the reaction mixture per unit time is from 3 to 6 times the volume of hydrogen consumed by the reaction mixture during the same time.

3. A process in accordance with claim 1 in which the rate of excess hydrogen passing through the reaction mixture is from about 4 to about 10 cubic meters per hour per square decimeter of horizontal cross section of the reaction mixture.

4. A process in accordance with claim 1 in which water is a byproduct of the hydrogenation reaction and is entrained with vapors of the liquid phase and with excess hydrogen and separated therefrom following condensation.

5. A process in accordance with claim 1 in which the hydrogenation temperature is from about 20° C. to about 30° C. below the boiling point of the solvent.

References Cited
UNITED STATES PATENTS 3,032,586  5/1962  Dierichs et al. _____ 260—580

CHARLES B. PARKER, Primary Examiner

R. L. RAYMOND, Assistant Examiner

U.S. Cl. X.R.

260—635, 690

PO-1050
(5/69)

UNITED STATES PATENT OFFICE
CERTIFICATE OF CORRECTION

Patent No. 3,546,296     Dated December 8, 1970

Inventor(s) GEORGES GOBRON and ROBERT PIPON

It is certified that error appears in the above-identified patent and that said Letters Patent are hereby corrected as shown below:

Column 8, line 5, "1:8.8" should read -- 1:0.8 --

Signed and sealed this 25th day of January 1972.

(SEAL)
Attest:

EDWARD M. FLETCHER, JR.
Attesting Officer

ROBERT GOTTSCHALK
Commissioner of Patents